Patented Feb. 21, 1950

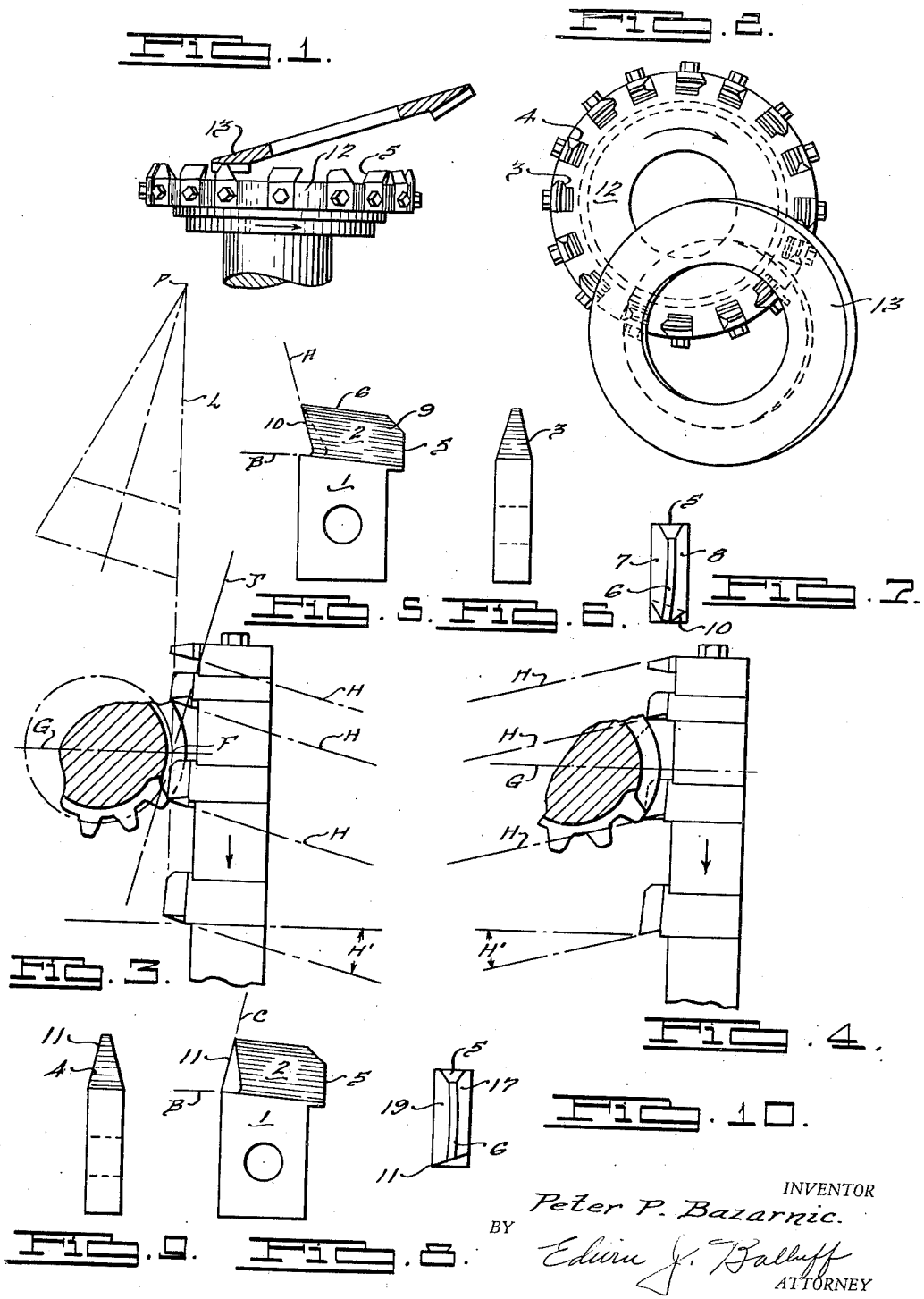

2,497,923

UNITED STATES PATENT OFFICE 2,497,923

METHOD OF AND APPARATUS FOR FORMING TEETH OF SPIRAL OR HYPOID BEVEL GEARS

Peter P. Bazarnic, Grosse Pointe, Mich.

Application January 11, 1943, Serial No. 472,056

18 Claims. (Cl. 90—5)

This invention relates to a method of and apparatus for arcuately planing and/or cutting and/or finishing longitudinally curved or spiral surfaces, and, more particularly, such surfaces as the longitudinally curved teeth of spiral or hypoid bevel gears.

The primary object of the invention is to provide a method of and apparatus for producing bevel gears and pairs of bevel gears, which will actually mesh or mate without "bias bearing," and whose tooth surface contact will extend throughout the height of the teeth from the roots thereof to the end faces of the teeth so as to obtain, in fact, and effect spur gear action in spiral or hypoid bevel gears, which means, a maintenance of the tooth contact true to the line of action.

Another object of the invention is to perform the foregoing in the simplest and most practical way with existing machinery by providing cutter blades of mill cutter heads with pitch or inclined cutting edges bearing a definite relation to the pressure angle of the blade, in order that the cutting edges will move along a line which maintains a constant angle with respect to a common tangent of two pitch cone surfaces.

A further object of the invention is to provide for cutting bevel spiral or hypoid gears in which the sides of adjacent teeth may be cut simultaneously with the spread blade method, or one at a time.

Other objects and advantages of the invention will become apparent during the course of the following description.

Fig. 1 is a side elevation with the gear blank in section showing the inside and outside cutter blade assembly.

Fig. 2 is a plan view showing the alternate forwardly and rearwardly inclined face angle cutter blade assembly and a ring gear blank during operation.

Fig. 3 is a side elevation showing the inside cutter blade assembly and a sectional end view of a conical gear blank taken on the back cone radius with a projection of the pitch cone.

Fig. 4 is a side elevation showing the outside cutter blade assembly and a sectional end view of a conical gear blank taken on the back cone radius.

Fig. 5 is an enlarged side elevation of the outside cutter blade.

Fig. 6 is an enlarged front elevation of the outside cutter blade.

Fig. 7 is an enlarged plan view of the outside cutter blade.

Fig. 8 is an enlarged side elevational view of the inside cutter blade.

Fig. 9 is an enlarged front elevational view of the inside cutter blade.

Fig. 10 is an enlarged plan view of the inside cutter blade.

In Fig. 1 there is shown a rotary annular face mill or head 12 on which are assembled the alternately inclined angled front face cutter blades. Each blade comprises a body portion 1 and cutting portion 2, on which are formed the angled front face 3 (Figs. 5-7) or 4 (Figs. 8-10), a back face 5, an end face 6, and two side faces 7—8 (Figs. 5-7) and 17—19 (Figs. 8-10). The forwardly inclined angled front face 3 with side face 8 forms an angled cutting edge 10 and is used as an outside cutting blade when mounted on face mill cutter head 12 as shown in Figs. 1, 2 and 4. Numeral 13 indicates a ring gear blank.

The angle indicated by the lines A—B (Fig. 5) indicates the angle or hook of the forwardly inclined cutting edge 10 while the angle indicated by the line B—C indicates the angle or rake of the rearwardly inclined cutting edge 11, which is formed by the front face 4 and side face 19.

While the present invention may be applied to the production of straight tooth gears, it is particularly applicable to the manufacture of curved tooth or spiral or hypoid gears and it is in connection with the latter types of gears that the invention is herein described for purposes of illustration.

As stated in the objects of the invention, the principal purpose of the invention is to enable the cutting of both members of a spiral or hypoid bevel gear set in a manner to entirely eliminate "bias bearing" with existing machinery. To this end, the gear is preferably cut in a generating operation in which the tool and blank are rolled relatively to one another as though the pitch surface of the blank were rolling upon the pitch surface of a nominal crown or basic gear represented by the tool. The gear and pinion can accordingly be produced upon the standard Gleason spiral gear generator, the structure of which is generally described in United States Patent granted to Gleason, No. 1,203,608 of November 7, 1916.

The ring gear is produced in a manner similar to that employed at the present time in cutting bevel gears, either spread blade or single blade. The cutting tool employed for illustrative purposes as well as the most practical embodiment of the invention, is a rotary, annular face mill, such as indicated by the numeral 12 in Figs. 1 and 2 provided with a plurality of blades. The blank to be cut into a spiral bevel gear is indicated by numeral 13. As is well known, in the type of Gleason machine referred to, the tooth profiles of the blank are generated by rotating the tool 12 in engagement with the blank, while the tool and blank are moved relatively to each other as though the blank were rolling with a crown or basic gear, represented by the tool. This generating operation involves the rotation of tool 12 upon its axis, and preferably the blank 13 is rotated upon its axis, while simultaneously an additional relative movement is imparted by the tool 12 and blank 13 about an axis representing the axis of the basic gear, which is the axis of the cradle of face mill 12, and thus a generating motion is produced between the tool and blank as though the blank were rolling on a basic gear. In this old method the cutter blades carried by the rotary annular mill head have straight cutting edges arranged generally parallel to the axis of the head, which arrangement coupled with the relative movement of the tool and the blank during the generating operation, causes the angular relation between these straight cutting edges of the blades and blank to continually change during their movement along the entire tooth profile, thereby resulting in "bias bearing" in the profile. This bias bearing is simply a tooth surface contact which extends diagonally across the faces of the tooth when the mating gears are run together or meshed, and which tooth surface contact does not extend from the roots of the teeth to the end faces thereof throughout the length of the teeth. Many attempts have been made to eliminate this "bias bearing" to produce a more powerful and silent drive between the pair, but without success.

I have discovered, however, that this "bias bearing," or tooth imperfection, can be eliminated by compensating for the modification of the tooth profile caused by the variant angularity resulting from the relative movements of the tool and blank, by maintaining constant the angle of the cutting edge of the tool with respect to the common tangent of the two pitch cone surfaces along the entire length or direction of the pitch cone angle of the blank, or causing the active part of the tool to maintain a constant angle H (Figs. 3 and 4) substantially equal to the pressure angle of the tooth being formed, while moving along the entire tooth profile. This may be accomplished in several ways, all of which are considered to be within the scope of this invention.

One of the ways is to position the cutting edges of the blades at an angle bearing a definite relation to the pressure angle and more particularly at an angle substantially approximating or corresponding to such pressure angle This positioning of the cutting edges of the blades can be obtained by forming the cutting edges at such angles directly upon the blades, or positioning the ordinary straight edged blades at an angle to the axis of the face mill head 12, so as to pitch or incline the cutting edges, or to cut either or both with planing tools which move in arcuate paths, so as to maintain this desired relation between the cutting edges of the blades and the blank. This present invention may be applied to grinding and is not confined to the production of gears with milling or planing tools, and it will be understood that the term "cutting" as used in the specification and claims is intended to cover any of these operations.

The preferred and simplest way is to form the cutting edge at the proper angle directly upon the blade, as this can be done with blades used at present by simply grinding them down, or new blades formed without necessitating any changes in the present Gleason bevel gear generators.

In Figs. 3 and 4 it is proposed to illustrate the theory and principle of the invention by more clearly showing and defining the pressure angle and its relation to the gear and cutter head proper.

In Fig. 3 is shown in section a conical gear blank taken on the back cone radius having a pitch cone L with its apex on the cutting or root angle at point P shown by the dotted line. From the root cone angle the involute of the tooth is generated with the cutting edge on line H constant to tangent G. Tangent G represents the common tangent of two pitch cone surfaces that two conical gears would make rolling together on the pitch line.

The angle H', which the common normal J to a pair of conjugate teeth, makes with the tangent G at the pitch point F, is the angle of obliquity, or the angle of pressure.

The angle of pressure being constant, and the paths of the elements of a crown or rack tooth being right lines, it follows that the tooth outline of the involute rack must be a right line as represented by the line H in Figs. 3 and 4 arranged at right angles to the line J, Fig. 3, representing the line of action or pressure.

This invention proposes to preserve the condition of constant velocity ratio of the spiral or hypoid type of bevel gear by causing the active or cutting edge of the tool to accurately follow the paths of the elements of the imaginary crown gear or rack tooth.

In the spiral type of bevel gear, the teeth of the gear are inclined or curved in the opposite direction to those of the pinion, one being right hand and the other left. This inclination of the teeth causes them to thrust in and out according to the hand of the teeth and the direction of rotation, while the pitch pressure angle causes the pinion to thrust out at its apex. This to an extent is favored by co-ordinately changing the lines of pressure from end to end, or toe to heel, of both gear and pinion, the faces tend to act in a direction of opposition and the load on the bearings is reduced. Stated in another way, the mating odontoids of a rack outline may be represented by the right line H, the equal and gradual tilting inclination of the common normals to the common tangent will result in mating gear teeth having coinciding odontoidal sections approximately conjugate to each other.

In general, while I have described my invention with reference to a particular embodiment, it will be understood that the invention is capable of further modification within the limits of the disclosure and the scope of the appended claims, and that this application is intended to cover any variations, uses or adaptations in my invention, following, in general, the principles of the invention, and including such departures from the present disclosure as come within known or customary practice in the gear art, and as may be applied to the essential features hereinbefore set forth, and as fall within the limits of the accompanying claims.

I claim:

1. The method of generating spiral gear teeth consisting of passing a cutter blade through a gear blank, and maintaining the cutting edge of said blade with respect to the pitch cone plane and a line parallel to the axis of the cutter at an angle substantially approximating the pressure angle of the tooth being formed while cutting along the entire face of said tooth.

2. The method of forming a gear tooth in a blank consisting of passing a tool through the blank while rotating the tool on a shifting axis to cut a side face of a spiral gear tooth, and causing the cutting edge of said tool to maintain constantly the same angle with respect to the radius of said blank while passing along the entire face of the tooth, which angle substantially approximates the pressure angle of the blade.

3. The method of generating spiral teeth in a gear blank, consisting of rotating the blank while rotating a mill cutter head and rocking the axis thereof, and maintaining the angle of the cutting edge of a tool mounted upon said head constant relative to a tangent of the blank while cutting along an entire face of a tooth.

4. The method of producing a bevel spiral gear, which consists in cutting the side tooth surface thereof by moving a cutting tool across the face of a blank while imparting a relative rolling movement between the tool and blank as though the blank were rolling on a basic gear, the cutting edge of the tool being inclined with respect to the pitch cone plane and a line parallel to the axis of the cutter to substantially approximate the pressure angle of the tooth being cut.

5. The spread blade method of producing a bevel spiral gear, which consists in simultaneously cutting two side tooth surfaces by moving inside and outside cutting tools across the face of a blank while imparting a relative rolling movement between the tools and blank as though the blank were rolling on a basic gear, the cutting edges of said blades being inclined with respect to the pitch cone plane and a line parallel to the axis of the cutter to substantially approximate the pressure angle of said blades.

6. A gear cutting blade adapted to be rotated on a shifting axis and having a cutting edge positioned at an angle with respect to the front face of the blade, which angle substantially approximates the pressure angle of said blade.

7. A gear cutter blade having a cutting portion formed on the arc of a circle from front to back and having a cutting edge formed at an angle to a plane extended perpendicularly and transversely of said cutting portion which angle of the cutting edge substantially approximates the pressure angle of said blade.

8. A gear cutter blade having a cutting portion formed on the arc of a circle from front to back with a side face arranged at an angle substantially corresponding with the pressure angle of a tooth to be cut with said blade, and said cutting portion having a cutting edge arranged at an angle to a plane extended perpendicularly and transversely of said cutting portion to substantially approximate the pressure angle of said blade.

9. A mating inside gear cutter blade having a front face angle inclined to the base or body portion at an angle approximating the side face pressure angle of said blade.

10. The spread blade method of producing a bevel spiral gear, which consists in simultaneously cutting two side tooth surfaces by moving inside and outside cutting tools across the face of a blank while imparting a relative rolling movement between the tools and blank as though the blank were rolling on a basic gear, the cutting edge of the outside cutting tool being inclined forwardly and the cutting edge of the inside cutting tool being inclined rearwardly both at angles with respect to the pitch cone plane and a line parallel with respect to the pitch cone plane and a line parallel to the axis of rotation of the tools at angles approximating the pressure angles of the cutting tools.

11. A rotary gear cutter having inside and outside cutting blades mounted thereon for rotation about the central axis of said cutter, said outside blade being adapted to generate one side of the gear tooth and said inside blade being adapted to cut the adjacent side of a gear tooth, said blades having side faces adjacent the teeth being cut equal to the pressure angle of the teeth being cut, said outside blade having a cutting face inclined forwardly and said inside blade having a cutting face inclined rearwardly, the inclination of said faces from a line parallel to said axis of rotation being equal to said pressure angle in both instances.

12. A rotary gear tooth cutter comprising a head having an annular series of cutter blades, each of said blades having a side face arranged at an angle equal to the pressure angle of the tooth to be cut by said cutter, each of said blades having along the forward end of said face an inclined cutting edge, the inclination of which with respect to a line parallel to the axis of rotation of said head is substantially equal to said pressure angle.

13. A rotary gear tooth cutter according to claim 12 wherein said head comprises a face mill and said blades are disposed around the periphery thereof.

14. A rotary gear tooth cutter according to claim 12 wherein said cutting edge is inclined forwardly.

15. A rotary gear tooth cutter according to claim 12 wherein said cutting edge is inclined rearwardy.

16. A gear cutter blade having a side face formed on the arc of a circle from front to back and arranged at an angle equal to the pressure angle of the tooth to be cut by said blade, the forward edge of said face being formed to provide an inclined cutting edge, the inclination of which with respect to the axis of said circle is substantially equal to said pressure angle.

17. A cutter blade according to claim 16 wherein said cutting edge is inclined forwardly.

18. A cutter blade according to claim 16 wherein said cutting edge is inclined rearwardly.

PETER P. BAZARNIC.

REFERENCES CITED

The following references are of record in the file of this patent:

UNITED STATES PATENTS

| Number | Name | Date |
|---|---|---|
| 1,667,299 | Wildhaber | Apr. 24, 1928 |
| 1,685,442 | Wildhaber et al. | Sept. 25, 1928 |
| 1,686,054 | Wildhaber | Oct. 2, 1928 |
| 1,727,740 | Wildhaber | Sept. 10, 1929 |
| 1,812,384 | Trbojevich | June 30, 1931 |
| 2,268,326 | Stewart et al. | Dec. 30, 1941 |
| 2,270,003 | Head | Jan. 13, 1942 |
| 2,274,761 | Wildhaber | Mar. 3, 1942 |
| 2,342,232 | Wildhaber | Feb. 22, 1944 |